United States Patent [19]

Watkins et al.

[11] Patent Number: 5,275,327

[45] Date of Patent: Jan. 4, 1994

[54] INTEGRATED OPTICAL SENSOR

[75] Inventors: Arthur D. Watkins; Herschel B. Smartt; Paul L. Taylor, all of Idaho Falls, Id.

[73] Assignee: EG&G Idaho, Inc., Idaho Falls, Id.

[21] Appl. No.: 960,329

[22] Filed: Oct. 13, 1992

[51] Int. Cl.$^5$ .................. B23K 9/12; G06F 15/46
[52] U.S. Cl. ........................ 228/102; 228/9; 219/124.34; 219/130.01
[58] Field of Search ............ 228/102, 105, 7-9; 29/407, 702, 709; 219/124.34, 130.01; 250/559

[56] References Cited

U.S. PATENT DOCUMENTS

| | | | |
|---|---|---|---|
| 4,306,144 | 12/1981 | Masaki | 219/124.34 |
| 4,649,426 | 3/1987 | Bolstad | 358/101 |
| 4,654,949 | 4/1987 | Pryor | 29/407 |
| 4,877,940 | 10/1989 | Bangs et al. | 219/124.34 |
| 4,951,218 | 8/1990 | Okumura | 219/124.34 |
| 5,150,175 | 9/1992 | Whitman | 250/559 |

OTHER PUBLICATIONS

Agapakis, et al., Joint Tracking & Adaptive Robotic Welding Using Vision Sensing of the Weld Joint Geometry, Welding Journal, vol. 65, No. 11, pp. 33-41 (1986).
Hanright, Robotic Arc Welding Under Adaptive Control—A Survey of Current Technology, Welding Journal, vol. 65, No. 11, pp. 19-24 (1986).
Richardson, et al., Coaxial Arc Weld Pool Viewing for Process Monitoring & Control, Welding Journal, vol. 63, No. 3, pp. 43-50 (1984).
Lukens, et al, Infrared Temperature Sensing of Cooling Rates for Arc Welding Control, Welding Journal, vol. 61 No. 1, pp. 27-33 (1982).

Primary Examiner—Samuel M. Heinrich
Attorney, Agent, or Firm—Alan D. Kirsch

[57] ABSTRACT

An integrated optical sensor for arc welding having multifunction feedback control. The sensor, comprising generally a CCD camera and diode laser, is positioned behind the arc torch for measuring weld pool position and width, standoff distance, and post-weld centerline cooling rate. Computer process information from this sensor is passed to a controlling computer for use in feedback control loops to aid in the control of the welding process. Weld pool position and width are used in a feedback loop, by the weld controller, to track the weld pool relative to the weld joint. Sensor standoff distance is used in a feedback loop to control the contact tip to base metal distance during the welding process. Cooling rate information is used to determine the final metallurgical state of the weld bead and heat affected zone, thereby controlling post-weld mechanical properties.

21 Claims, 6 Drawing Sheets

INTEGRATED OPTICAL SENSOR

CONTRACTUAL ORIGIN OF THE INVENTION

The United States Government has rights in this invention pursuant to contract No. DE-AC07-76ID01570 between the U.S. Department of Energy and EG&G Idaho, Inc.

BACKGROUND OF THE INVENTION

This invention relates to a sensor for welding operations and more particularly to a multifunction feedback control sensor for gas-tungsten and gas-metal arc welding operations.

Automated welding requires a welding system capable of adapting to changing conditions encountered during the welding process. Many sensor systems have been developed to give automated welding systems the capability to adapt to variations in one parameter. For example, Agapakis, J. E., et al. *Welding Journal* vol. 65, No. 11, pp. 33-41 (1986), describes laser striping for joint tracking, and Hanright, J., *Welding Journal* vol. 65, No. 11, pp. 19-24 (1986), discusses through-the-arc sensing techniques. Additionally, coaxial viewing of the weld pool and infrared sensings are discussed in Richardson, R. W., et al., *Welding Journal* vol. 63, No. 3, pp. 43-50 (1984), and Lukens, W. E., et al., *Welding Journal* vol. 61, No. 1, pp. 27-33 (1982), respectively.

However, frequently it is desired to continuously monitor, in real-time, more than one parameter in the welding process, such as, the weld pool position and width, sensor-to-work piece distance and weld pool bead centerline cooling rate. Continuous monitoring of surfaces requires that light be reflected or emitted from those surfaces at sufficient strength so that attributes of the surface can be detected by the imaging device. Additional light, other than that which is required for imaging, shows up in the image as noise and degrades the quality of the image. In some cases, image degradation is so severe that the desired details or attributes within the image are lost and cannot be recovered. In the case of welding, the arc is a high luminosity light source that degrades the weld pool image to the extent that attributes of the weld pool and adjacent areas are unclear, unless light suppression techniques are used.

It is an object of this invention to provide an automated multifunction feedback control sensor for welding that is independent of significant operator interaction.

It is another object of this invention to provide a multifunction feedback control sensor capable of measuring weld pool position and width, sensor-to-work piece distance and weld bead centerline cooling rate.

Additional objects, advantages and novel features of the invention will become apparent to those skilled in the art upon examination of the following and by practice of the invention.

SUMMARY OF THE INVENTION

To achieve the foregoing and other objects, an integrated optical sensor for arc welding having multifunction feedback control is provided. The integrated optical sensor consists of a computer automated system using a single charged coupled device (CCD) image to measure weld pool position, width and discrete temperature normal to molten weld pool/solidified weld bead interface. The integrated optical sensor also determines solidified weld bead profile and centerline cooling rate. Computer process information from this sensor is passed to a controlling computer for use in feedback control loops to aid in control of the welding process. The weld pool position and width data along with information from a separate joint preview sensor is used to track the molten weld pool along a desired path in the weld joint. Solidified weld bead profile information is used as a basis to adjust welding process parameters to control welding torch standoff and adherence to weld bead fill strategies. Centerline cooling rate information is used to determine and control thermal input to the weld.

BRIEF DESCRIPTION OF THE DRAWINGS

The present invention is illustrated in the accompanying drawings where:

FIG. 3b shows a schematic drawing of the raw input image of FIG. 3a;

FIG. 4b shows a schematic drawing of the processed image of FIG. 4a.

DETAILED DESCRIPTION OF THE INVENTION

Figure 1:
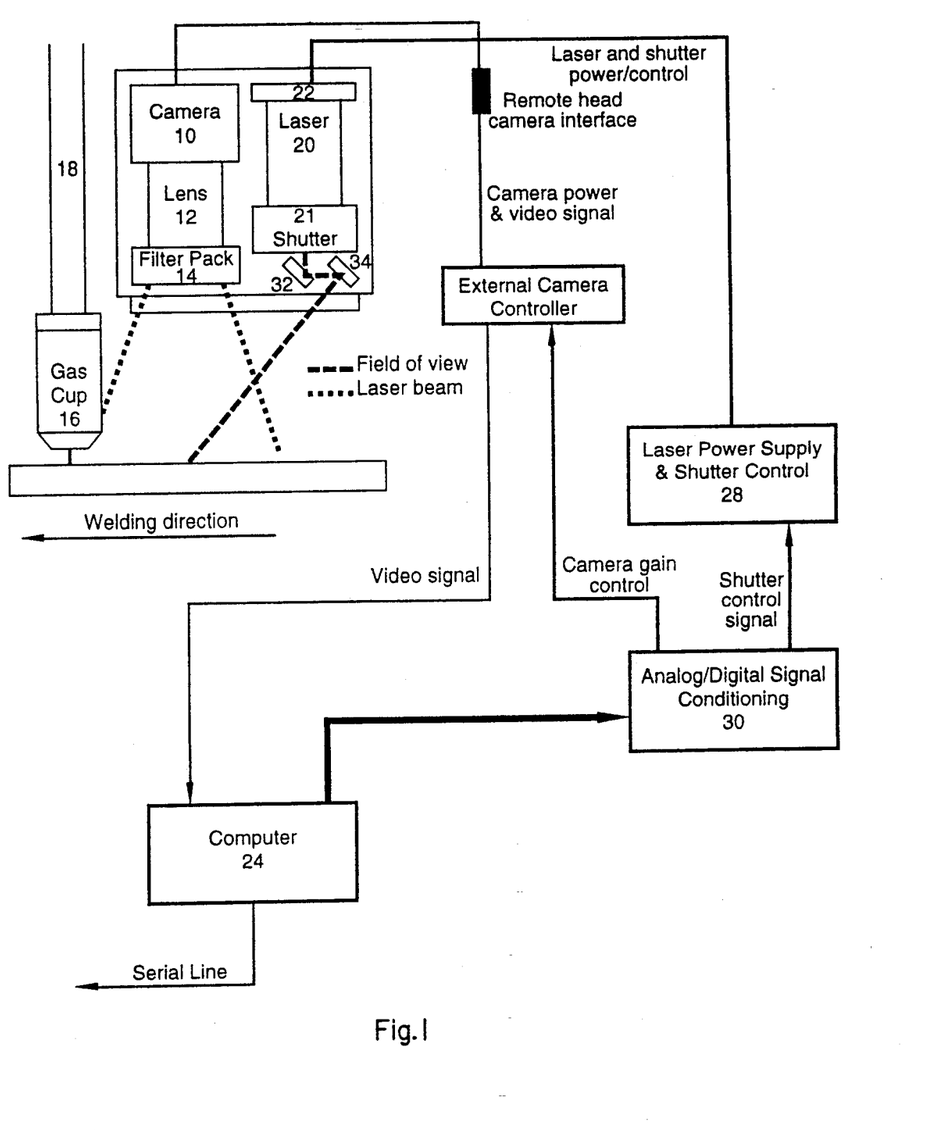
FIG. 1 is a schematic diagram of the integrated optical sensor system.

Referring now to FIG. 1, a schematic diagram of the integrated optical sensor (IOS) system is shown. The integrated optical sensor is comprised of a CCD camera 10 with fixed optics consisting of a lens 12 and filter 14 for imaging the weld pool and adjacent areas. The integrated optical sensor relies on two techniques to suppress entry of direct arc light into the sensor. Suppression occurs by positioning the sensor so that the gas cup 16 of the welding torch 18 acts as a mask to shield the CCD camera from light directly emitted from the welding arc, but allows arc light reflected or emitted infrared from the surface of the molten weld pool and adjacent areas to be used for imaging. Light intensities are further attenuated and discriminated by using an extremely narrow, band pass or laser line filter 14. This filter allows light in some narrow bandwidth, for example, at 850 nanometers, plus or minus 0.5 nanometers (at half peak height), to pass through the filter and rejects all other wavelengths. Additionally, the filter has a transmittance of approximately 45% in the band pass wavelength, meaning that the incoming light intensities are cut by 55% after passing through the filter.

Lens 12 is used to focus the incoming light onto the CCD camera detector. The field of view and magnification may be further modified by using a extension tube (not shown) placed between the lens 12 and the CCD camera 10. The extension tube increases the magnification and decreases the field of view, and allows the lens to be focused at the appropriate standoff distance from the weld bead. Different extension tubes can be used to allow the lens to be focused at different standoff distances. An iris in the lens can be manually adjusted to modify the quantity of light passing through the camera lens, or alternatively, the computer can control the lens and iris automatically.

The camera used in the IOS is light and compact and is unobtrusive to the normal operation of the welding system. Preferably, the CCD camera is tilted off the torch axis between 5° to 15°. The remote head containing the CCD detector is distant from the main camera body by preferably approximately 2.3 meters. A camera control unit 26 regulates the gain, pedestal, and gamma levels of the CCD camera. Additionally an enhancer is installed in the camera control unit to enhance the analog video output signal of the CCD camera. Connection between the camera control unit 26 and the computer data acquisition system 24 is by a coaxial cable. The camera control unit can be modified to allow computer control of the camera gain, pedestal and gamma functions.

A diode laser 20 with striping optics is used to produce a stripe transverse to the direction of welding. The diode laser operates at the same wavelength frequency as the band pass filter 14, preferably approximately 850 nanometers, plus or minus 0.2 nanometers. The output power of the diode laser is adjustable to approximately 540 mW continuous wave power. The heart of the diode laser is a high power multi-mode continuous wave injection diode laser. The diode laser has a Peltier cooling unit 22 capable of maintaining the specified output frequency over a temperature swing from 0° to 100° F. The diode laser has adjustable line generating optics capable of producing a stripe with dimensions of 100 mm in length and 1 mm in width at a standoff distance of 200 mm. Laser shuttering means 21 can be provided for operational safety. The laser shutter and power control unit 28 can be controlled by the remote computer. In a preferred embodiment of the present invention, two mirrors located beneath the diode laser can be used to reflect the diode laser beam at the proper angle to the work piece 15. The angle of the laser stripe is dependent upon the sensor standoff distance and the accuracy required for the particular application. Preferably the angle of the laser stripe to the surface is between 50 to 80 degrees.

Figure 2:
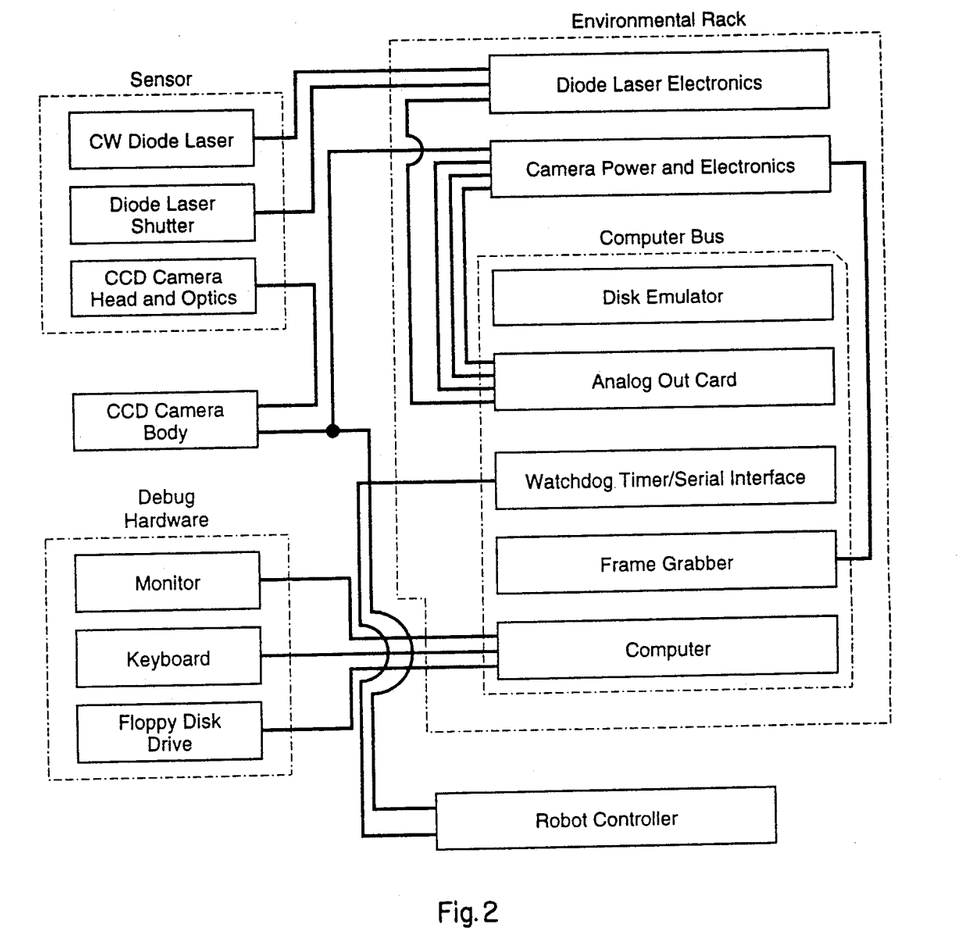
FIG. 2 is a schematic diagram of the hardware configuration for the integrated optical sensor system.

The computer data acquisition system 24 is comprised of several computer cards, including a disk emulator, analog output card, watchdog timer/serial interface card, a digitizing frame grabber and a microprocessor card. The hardware configuration for the integrated optical sensor system is shown in FIG. 2. The frame grabber card digitizes the video signal into discrete values representing the strength of the incoming video signal. These values are stored in dual-ported memory located on the frame grabber board. Preferably, the board digitizes the video signal and stores an image in one of two memory buffers at a rate of approximately 30 images per second. One complete image is referred to as a frame. A phase-locked loop circuit synchronizes the video timing of the frame grabber to the composite sync of the video input signal.

The controlling microprocessor is a stand-alone system which self-boots on system power up. The image processing system operates without a keyboard and monitor, however, a monitor and keyboard can be used for display or diagnostic information during system integration. Welding process communications to and from the controller takes place through the watchdog timer/serial interface and proceeds at a rate of approximately 10 Hz.

The multifunction analog and digital I/O card (shown as 30 in FIG. 1) interfaces the camera control unit and the laser shutter with the sensor computer. The function of this card is to output analog voltages which allow computer control of the gain, pedestal, and gamma functions of the camera. Also, the card produces a TTL output to control shutter operations of the diode laser.

The solid state disk emulator with daughter card is capable of emulating a hard disk drive. The emulator should preferably have up to 770 kilobytes of primary boot disk EPROM storage and up to 64 kilobytes of read/write secondary disk SRAM storage. The operational software and sensor calibration information are stored on these cards.

There are four stages of data processing: acquisition, data validity check, unit conversion, and data output. The acquisition process is further divided into three operations. Generally, each operation begins with the acquisition of a new image by the frame grabber. A portion of the image that is of interest, called a region of interest (ROI), is then transferred to the computer's RAM for processing. Once the data has been extracted from the regions of interest, a validity check is performed. If the data is determined to be valid, it is converted to the appropriate unit of measure and then sent out through the serial communication port to the process controlling computer.

Figure 3A:
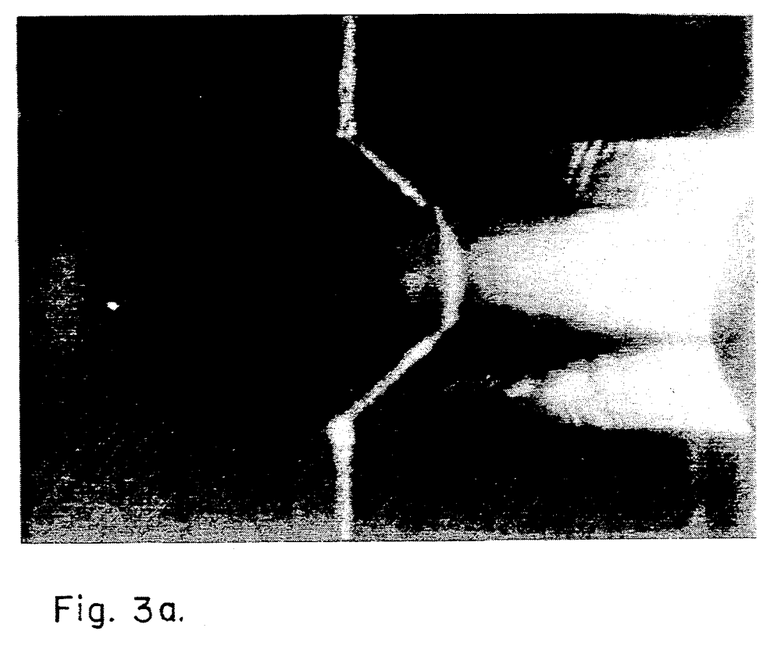
FIG. 3a is a computer generated photograph of an unprocessed image output from the sensor.
Figure 3B:
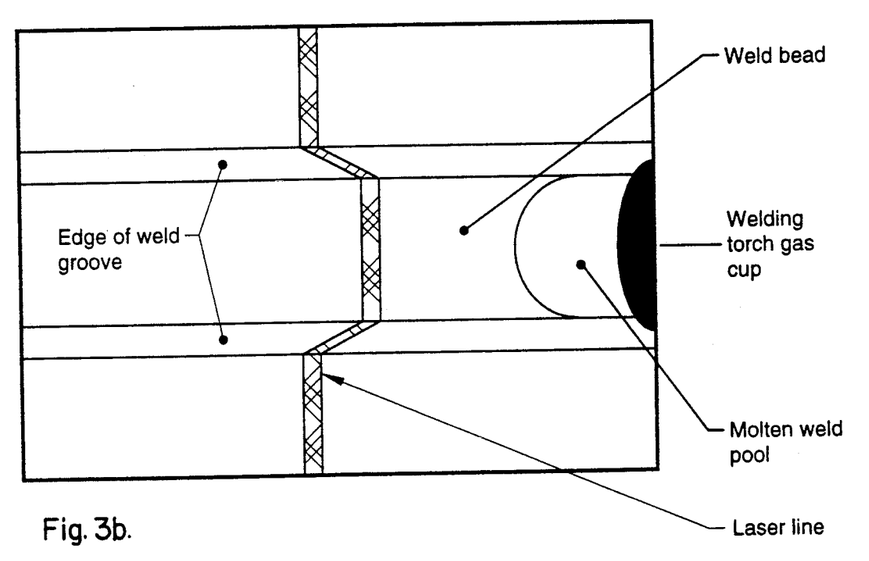
Figure 4A:
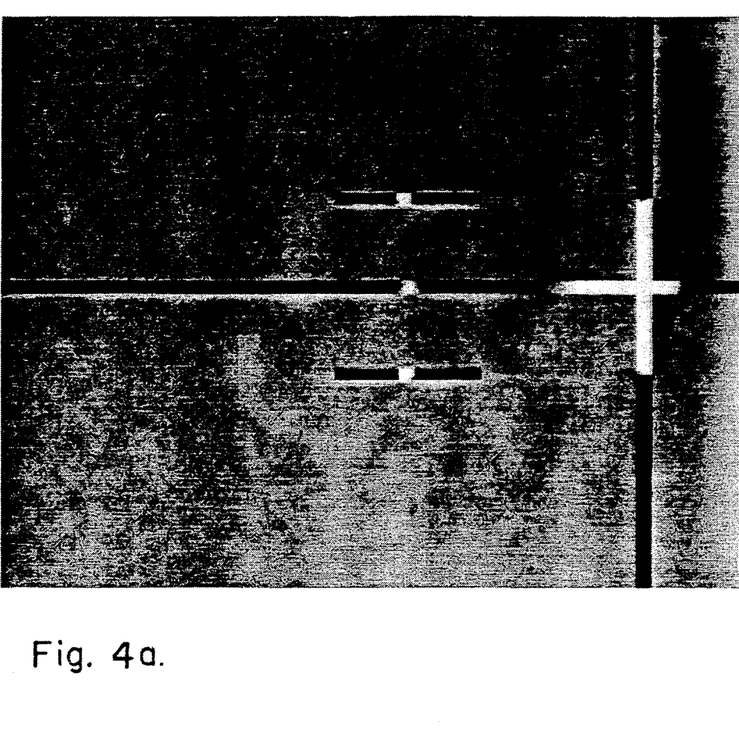
FIG. 4a is a computer generated photograph of a processed image from the sensor showing laser line displacement.
Figure 4B:
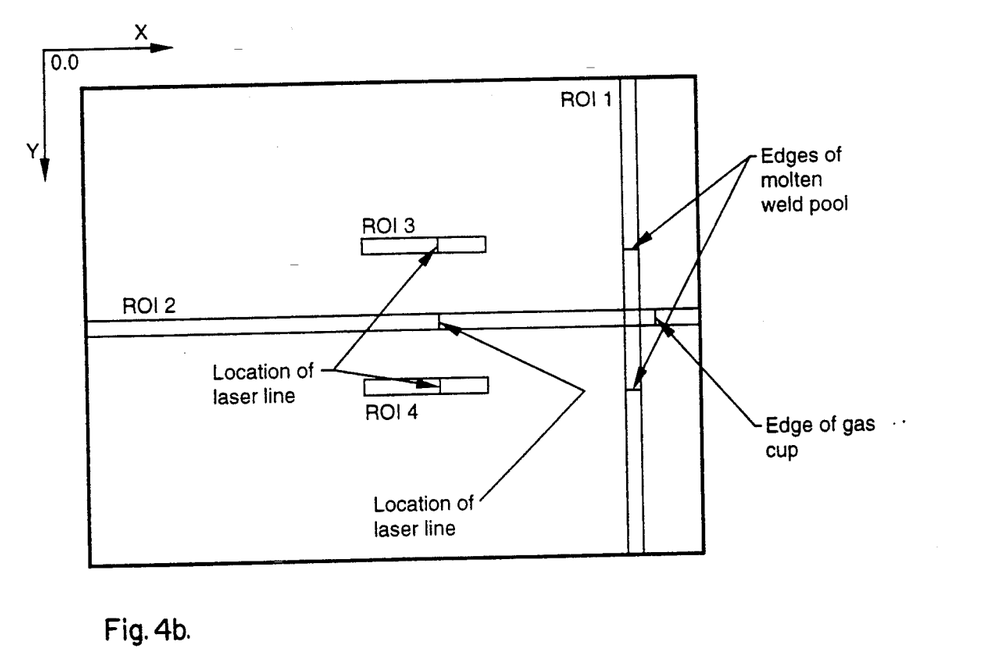

FIGS. 3a and 4a, respectively illustrate the unprocessed and processed computer generated photographs of a welding operation. Referring now to FIGS. 3b and 4b, a detailed description of each data acquisition operation is provided. The first acquisition operation extracts the locations of the edges of the molten weld pool from ROI 1. The operation begins by transferring the pixel intensities in ROI 1 to the computer's RAM. The location of ROI 1 is shown in FIG. 4b and is determined by the position of the welding torch gas cup. The position of the welding torch gas cup is determined in the second acquisition operation, which is described below. If the second acquisition operation does not find the welding torch gas cup, a default location is used. The edges of the molten weld pool are determined by scanning ROI 1 in the y-direction (see FIG. 4b) using two image processing techniques: thresholding and gradient detection. Thresholding elevates all pixel intensities above a specific level to the maximum intensity and all intensities below a specific level to the minimum intensity. The thresholding levels are determined by reading intensity levels in the weld pool area and setting the thresholding levels a determined amount above and below the weld pool intensity. Gradient detection locates the position in the ROI where a sharp gradient in image intensity occurs. Two gradients are found in ROI 1 and their locations are stored as x,y coordinate pairs which will be transformed into part of the sensor's output. The location of the center of the weld pool (in the y-direction) is calculated using the two locations. The center location is stored for use by the second acquisition operation. The first acquisition operation is continuously repeated until it is completed successfully.

The second acquisition operation extracts three pieces of information, viz.: the location of the welding torch gas cup edge; the location where the laser line appears in the ROI; and the cooling rate of the solidified weld bead where a pre-determined temperature occurs. The second acquisition operation begins by transferring the pixel intensities in ROI 2 into the computer's RAM. ROI 2 is positioned over the weld pool center (in the y-direction) determined in ROI 1. A gradient detection is performed to locate the edge of the gas cup and the center of the laser line in the x-direction of the image (see FIG. 4b). The location of the gas cup edge is stored for use by the first acquisition operation, while the location of the laser line is stored for use by the second acquisition operation. Both are used to determine the cooling rate of the weld bead by processing a row of pixel intensities down the center of ROI 2. This row is processed to remove the intensities of the laser line and gas cup, leaving only pixel intensities of the solidified weld bead. These intensities are statistically processed to determine the cooling rate at a specific temperature, which the sensor receives from the robot computer via the serial communication link. If no temperature value is received, a default value is used. The cooling rate for the location is then stored as a temperature change per pixel which will be transformed into part of the sensor's output. If the second acquisition operation cannot be completed successfully, the sequence stops and is returned to the first acquisition operation.

The third acquisition operation determines the location of the laser line at the edges of the weld bead from two ROIS. The locations for ROI 3 and ROI 4, as shown in FIG. 4b, are determined in the first and second acquisition operations. The centers of these RoIs, in the x-direction, are placed at the laser line location determined in the first operation. ROI 3 and ROI 4 are placed, in the y-direction, at the upper and lower weld bead edge, respectively, as determined in the first acquisition operation. A gradient detection is performed on each ROI to locate the center of the laser line in each ROI. The x-coordinate of the center of the laser line in each ROI are stored so they can be transformed for the sensor's output.

When the three acquisition operations are completed, the data is checked for validity. The pool edge locations are compared with known boundary conditions and if they are within these boundary conditions, the data are passed as valid. The laser line locations found in ROI 2 and ROI 3 are checked to see that they are within a preset boundary in the image area. If they fall within the boundary, the data are passed as valid. A statistical correlation value is used to check the validity of the cooling rate information. This value is sent with the cooling rate data as part of the sensor's output.

Once the data are validated, each set of data is converted to a standard unit of measure. The data obtained during the calibration of the sensor are used to convert pixel coordinates into distances in a standard unit of measure. The weld pool edge locations are converted into distances from a center reference point in the image area. The laser line locations found in third acquisition operation three are converted into a work piece-to-reference point distance. The reference point is determined during sensor calibration. The cooling rate data are converted into a temperature change per unit distance or a temperature change per unit time. The cooling rate datum is accompanied by its statistical correlation. The data, converted to standard units, are sent through a serial communications link to the controlling computer for controlling the welding operation.

The pool position and width are used to control the welding torch position relative to the weld pool, allowing the host control system to compensate for such phenomena as arc blow. The host welding system uses the sensor standoff distance in the feedback loop to control the contact tip-to-work piece distance. Cooling rate information is used to infer the final metallurgical state of the weld bead and heat affected zone, thereby permitting control of post weld mechanical properties.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiments described explain the principles of the invention and practical application and enable others skilled in the art to utilize the invention in various embodiments and with various modifications as are suited to the particular use contemplated. It is intended that the scope of the invention be defined by the claims appended hereto.

The embodiments of this invention in which an exclusive property or privilege is claimed are defined as follows:

1. A method for electronic data acquisition and multifunction controlling of a welding operation, comprising the steps of:
   (a) positioning a laser and electronic imaging device in close proximity behind the path of a welding torch so that the torch shields the imaging device from light directly emitted from the welding arc site;
   (b) directing a laser stripe of a known wavelength from the laser to a position traversing a weld bead site;
   (c) filtering light reflected from the weld site by a band pass filter of approximately the same wavelength as the laser stripe;
   (d) acquiring images of the weld bead site by the electronic imaging device;
   (e) processing and extracting from the acquired image the location of: the molten weld pool edges, the welding torch gas cup edge, and the laser stripe;
   (f) analyzing the extracted information and calculating data for controlling the welding process;
   (g) controlling the welding process based upon the calculated data.

2. The method of claim 1 further comprising the step of determining the solidified weld bead profile and centerline cooling rate from the measured information.

3. The method of claim 2 wherein the solidified weld bead profile information is used as a basis to adjust welding process parameters to control the torch standoff distance and adherence to weld bead fill design.

4. The method of claim 2 wherein the centerline cooling rate information is used to determine and control thermal input to the weld site.

5. The method of claim 1 wherein the information extracted from the acquired images is enhanced by locating the position in the acquired image where a sharp gradient in image intensity occurs.

6. The method of claim 5 wherein the enhanced images are further intensified by using a thresholding technique which elevates all pixel intensities above an established threshold intensity level to the maximum intensity level and reduces all intensities below a threshold level to the minimum intensity level in order to emphasize the intensity of the image.

7. The method of claim 1 wherein controlling the acquisition of information of step (d) and analysis of the information of step (f) is performed by a computer.

8. The method of claim 1 wherein the laser stripe is a directed to the weld site at an angle between 50° and 80°.

9. The method of claim 1 wherein the laser wavelength and band pass filter are approximately 850 nanometers.

10. A system for data acquisition and control of a welding operation, comprising:
   a. an electronic image sensor positioned in close proximity behind the path of a welding torch on a work piece so that the torch shields the imaging device from light directly emitted from the welding arc site;
   b. means for creating a laser stripe transverse to a weld bead path, said laser stripe being a known wavelength;
   c. lens means attached to the electronic image sensor for focusing the image;
   d. a band pass optical filter to limit the frequency of light reflected from the weld bead being imaged, the band pass frequency corresponding to the wavelength of the laser stripe;
   e. computer means for acquiring and processing data from the image and controlling the welding process.

11. The system of claim 10 wherein the means for creating the laser stripe is a continuous wave diode laser.

12. The system of claim 11 wherein the diode laser generates a beam having a wavelength of approximately 850 nanometers.

13. The system of claim 10 further comprising means for cooling the laser to maintain a constant laser temperature and output beam wavelength.

14. The system of claim 10 wherein the imaging sensor is a charged coupled device camera.

15. The system of claim 14 further comprising a camera control unit to regulate the gain, pedestal and gamma levels of the charged coupled device camera.

16. The system of claim 10 wherein the computer means comprises a disk emulator, analog output card, watchdog timer/serial interface card, digitizing frame grabber and a microprocessor card.

17. The system of claim 10 wherein the lens means and adjustment is controlled by a computer.

18. The system of claim 10 further comprising an extension tube positioned between the image sensor and lens, said extension tube permitting the acquired image to be focused at an appropriate standoff distance from a work piece.

19. The system of claim 10 wherein the image sensor is positioned at an angle of between 5° and 15° from the welding torch axis.

20. The system of claim 10 further comprising means for directing the laser stripe to strike the work piece at an angle of between 50° and 80°.

21. The system of claim 19 wherein the means for directing the laser stripe is comprised of two mirrors located between the laser and the work piece.

* * * * *